Patented June 13, 1933

1,913,621

UNITED STATES PATENT OFFICE

IRA WILLIAMS, OF WOODSTOWN, NEW JERSEY, AND ARTHUR MORRILL NEAL, OF WILMINGTON, DELAWARE, ASSIGNORS TO E. I. DU PONT DE NEMOURS & COMPANY, OF WILMINGTON, DELAWARE, A CORPORATION OF DELAWARE

PRESERVATION OF RUBBER

No Drawing. Application filed June 30, 1932. Serial No. 620,308.

This invention relates to the preservation of rubber and more particularly to the incorporation of compounds in rubber which compounds retard that deterioration which rubber normally undergoes when subjected to the action of heat, light and oxidation.

It is well known that certain substances, for example, the secondary aromatic amines, possess the power, when incorporated in rubber, of retarding that deterioration of the rubber which is due to heat and oxidation. However, these compounds have generally proved to be unsuitable for use in certain types of white and light colored goods because of the fact that they discolor the rubber badly on exposure to light.

An object of the present invention is to incorporate in rubber a new class of compounds which will retard that deterioration which the rubber normally undergoes due to the action of heat, light and oxidation. A further object is to incorporate in rubber a class of compounds of the above type which do not discolor the rubber on exposure to light. Other and further objects are to provide a new composition of matter and to advance the art. Other objects will appear hereinafter.

These objects may be accomplished according to the present invention which comprises incorporating in rubber a compound of the type:

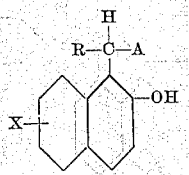

wherein R represents an aryl, substituted aryl or aralkyl radical; X represents hydrogen or an alkyl or alkoxy radical; and A represents a substituted or unsubstituted amino group. The various significations of A may be represented by the following radicals:

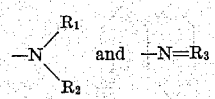

wherein $R_1$ and $R_2$ represent hydrogen, aryl, or aralkyl radicals and $R_3$ represents an aralkyl group connected to the nitrogen by a double bond or a radical wherein the nitrogen forms part of a heterocyclic ring, such as pentamethylene or morpholyl. When A represents the radical:

the complete formula will appear as follows:

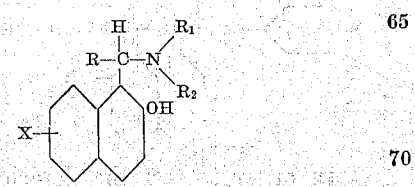

The term "aralkyl" as employed in the specification and claims may be defined as an alkyl group or radical having one or more of the hydrogen atoms thereof replaced by an aryl or substituted aryl group or radical.

Compounds of this type are well known and methods of making them together with their properties are described by Betti Gazetta Chemica Italiana, 1900, vol. 30, ii p. 310; Betti Gazetta Chemica Italiana, 1901, vol. 31, i p. 284; Littman & Brode, J. Amer. Chem. Soc. 52 1655 (1930), 53 1531 (1931). Detailed directions for preparing these compounds are also given in Organic Syntheses (1929) vol. 9, p. 60, published by John Wiley & Sons.

Among the compounds of this class which we have found to be particularly effective for our purpose are the following:

2-hydroxy-1-naphthyl-phenylamino-methane

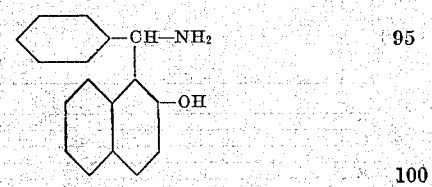

2-hydroxy-1-naphthyl-p-anisyl-amino-methane

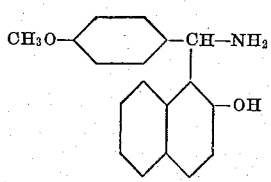

Phenyl-(benzylidene-imino)-2-hydroxy-1-naphthyl-methane

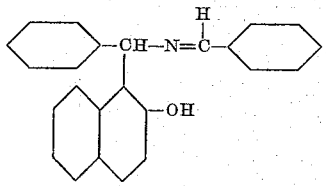

p-anisyl (p-methoxy-benzylidene-imino)-2-hydroxy-1-naphthyl-methane

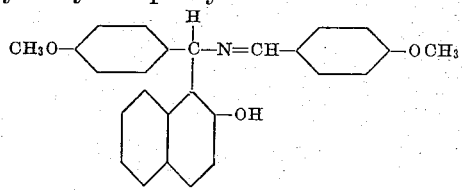

2-phenyl ethyl (3-phenyl-propylidene-imino)-2-hydroxy-1-naphthyl-methane

In order to test the deterioration retarding or inhibiting functions of these compounds the following stocks were prepared:

|  | A | B | C | D | E |
|---|---|---|---|---|---|
| Pale crepe | 100 | 100 | 100 | 100 | 100 |
| Zn oxide | 3 | 3 | 3 | 3 | 3 |
| Titanox | 50 | 50 | 50 | 50 | 50 |
| Sulfur | 2 | 2 | 2 | 2 | 2 |
| Thionex | 0.2 | 0.2 | 0.2 | 0.2 | 0.2 |
| 2-hydroxy-1-naphthyl phenylamino methane |  | 1 |  |  |  |
| 2-hydroxy-1-naphthyl p-anisylamino methane |  |  | 1 |  |  |
| Phenyl (benzylidene imino) 2-hydroxy-1-naphthyl methane |  |  |  | 1 |  |
| p-anisyl (p-methoxy benzylidene imino) 2-hydroxy-1-naphthyl methane |  |  |  |  | 1 |

These stocks were then vulcanized at 120° C. to a comparable state of cure. They were then subjected to artificial aging by suspending them in a Bierer-Davis bomb at 70° C. and 300 lbs. oxygen pressure per square inch, until they were completely deteriorated. The results of such tests appear in Table I.

Table I

| Stock | Days in bomb for complete deterioration |
|---|---|
| A | 7 |
| B | more than 14 |
| C | more than 14 |
| D | 13 |
| E | 12 |

In order to test the effects of this type of compound by the change in physical properties of the rubber containing the same on aging, the following stocks were prepared:

|  | A | A | C |
|---|---|---|---|
| Smoked sheet | 100 | 100 | 100 |
| Zinc oxide | 10 | 10 | 10 |
| Sulfur | 4 | 4 | 4 |
| Diphenyl guanidine | 1 | 1 | 1 |
| Phenyl-(benzylidene imino)-2-hydroxy-1-naphthyl methane |  | 1 |  |
| 2-phenyl ethyl-(3-phenyl propylidene imino)-2-hydroxy-1-naphthyl methane |  |  | 1 |

These stocks were then vulcanized to a comparable state of cure at 141° C. and tested by suspending them in the oxygen bomb at 70° C. and 300 lbs. oxygen pressure per square inch, for 48 hours. The effects of such treatment on the physical properties of the stocks are given in Table II.

Table II

| Stock | Original tensile | Tensile after aging |
|---|---|---|
| A | 3500 | 400 |
| B | 3375 | 1875 |
| C | 3350 | 2150 |

Other compounds of this class which should be given special consideration are:

2-hydroxy-1-naphthyl-phenyl-piperidyl-methane

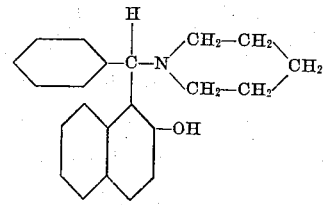

Phenyl-2-hydroxy-1-naphthyl-phenyl-amino-methane

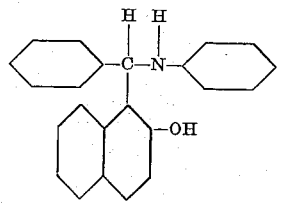

2-hydroxy-1-naphthyl-phenyl-morpholyl-methane

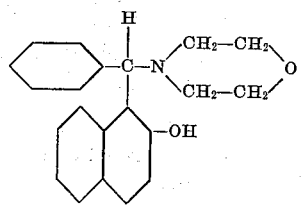

2-hydroxy-7-methoxy-1-naphthyl-phenyl-amino-methane

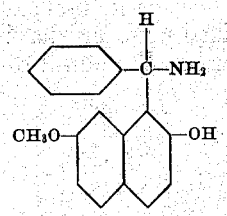

Phenyl-2-hydroxy-7-methyl-1-naphthyl-benzylamino-methane

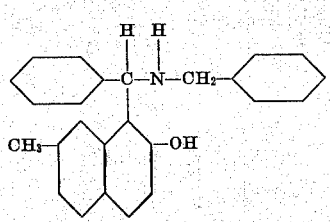

In the above examples, we have disclosed the use of one part of the deterioration inhibitor to 100 parts of rubber and also the incorporation of the inhibitors into the rubber prior to vulcanization. However, larger or smaller amounts of the inhibitor may be employed within a rather wide range. The particular amount of inhibitor employed depends largely upon the desire of the manufacturer and the conditions and characteristics of the rubber stock in which they are incorporated. Furthermore, these deterioration inhibitors may also be incorporated into the rubber after vulcanization by any of the well known methods of impregnation.

From the above examples, it will appear that we have found a new class of compounds which, when incorporated into rubber, effectively retard that deterioration of the rubber which is due to the action of light, heat and oxidation, that by incorporating these compounds into rubber we effectively retard deterioration thereof, and the resulting products have new and better properties than other previously known products of a similar type.

While we have disclosed the use of certain specific compounds in specific proportions, in particular rubber stocks, it will be apparent to those skilled in the art that many other compounds within the class may be employed, the proportions may be widely varied and the compositions of the stocks variously modified without departing from the spirit of our invention. Accordingly, the scope of our invention is to be limited solely by the appended claims construed as broadly as is permissible in view of the prior art.

We claim:

1. The method of preserving vulcanized rubber which comprises incorporating in the rubber a small amount of a compound of the type:

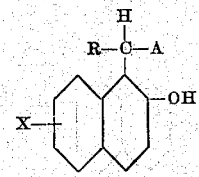

2. The method of preserving vulcanized rubber which comprises incorporating in the rubber a small amount of a compound of the type:

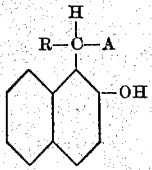

3. The method of preserving vulcanized rubber which comprises incorporating in the rubber a small amount of a compound of the type:

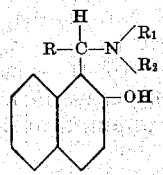

wherein R represents a member of the group consisting of aryl, aralkyl, and substituted aryl radicals and $R_1$ and $R_2$ represent members of the group consisting of hydrogen and aryl, aralkyl, and aralkylidene radicals.

4. The method of preserving vulcanized rubber which comprises incorporating in the rubber a small amount of a compound of the type:

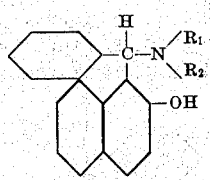

wherein $R_1$ and $R_2$ represent members of the group consisting of hydrogen and aryl, aralkyl and aralkylidene radicals.

5. The method of preserving vulcanized rubber which comprises incorporating in the rubber a small amount of a compound of the type:

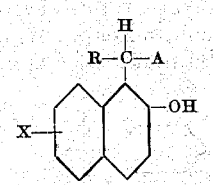

wherein A represents a nitrogen containing heterocyclic radical.

6. The method of preserving vulcanized rubber which comprises incorporating in the rubber a small amount of a compound of the type:

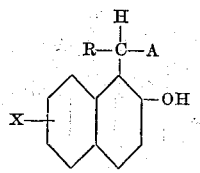

wherein A represents a nitrogen containing heterocyclic radical of the group consisting of pentamethylene and morpholyl radicals.

7. The method of preserving vulcanized rubber which comprises incorporating in the rubber a small amount of a compound of the type:

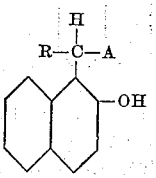

wherein A represents a nitrogen containing heterocyclic radical.

8. The method of preserving vulcanized rubber which comprises incorporating in the rubber a small amount of a compound of the type:

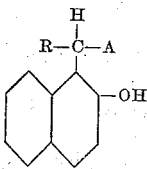

wherein A represents a nitrogen containing heterocyclic radical of the group consisting of pentamethylene and morpholyl radicals.

9. The method of preserving vulcanized rubber which comprises incorporating in the rubber a small amount of a compound of the type:

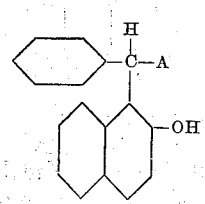

wherein A represents a nitrogen containing heterocyclic radical.

10. The method of preserving vulcanized rubber which comprises incorporating in the rubber a small amount of a compound of the type:

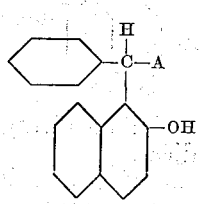

wherein A represents a nitrogen containing heterocyclic radical of the group consisting of pentamethylene and morpholyl radicals.

11. Vulcanized rubber having incorporated therein a small amount of a compound of the type:

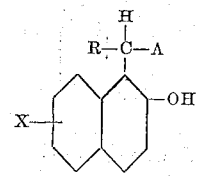

12. Vulcanized rubber having incorporated therein a small amount of a compound of the type:

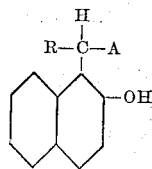

13. Vulcanized rubber having incorporated therein a small amount of a compound of the type:

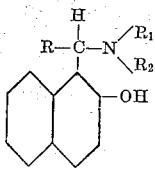

wherein R represents a member of the group consisting of aryl, aralkyl, and substituted aryl radicals and $R_1$ and $R_2$ represent members of the group consisting of hydrogen and aryl, aralkyl, and aralkylidene radicals.

14. Vulcanized rubber having incorporated therein a small amount of a compound of the type:

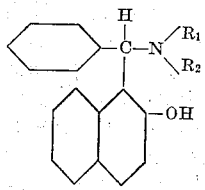

wherein $R_1$ and $R_2$ represent members of the group consisting of hydrogen and aryl, aralkyl and aralkylidene radicals.

15. Vulcanized rubber having incorporated therein a small amount of a compound of the type:

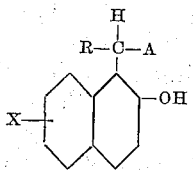

wherein A represents a nitrogen containing heterocyclic radical.

16. Vulcanized rubber having incorporated therein a small amount of a compound of the type:

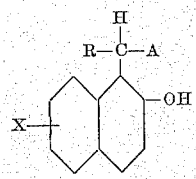

wherein A represents a nitrogen containing heterocyclic radical of the group consisting of pentamethylene and morpholyl radicals.

17. Vulcanized rubber having incorporated therein a small amount of a compound of the type:

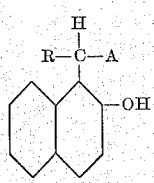

wherein A represents a nitrogen containing heterocyclic radical.

18. Vulcanized rubber having incorporated therein a small amount of a compound of the type:

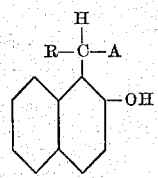

wherein A represents a nitrogen containing heterocyclic radical of the group consisting of pentamethylene and morpholyl radicals.

19. Vulcanized rubber having incorporated therein a small amount of a compound of the type:

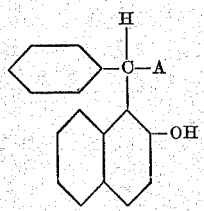

wherein A represents a nitrogen containing heterocyclic radical.

20. Vulcanized rubber having incorporated therein a small amount of a compound of the type:

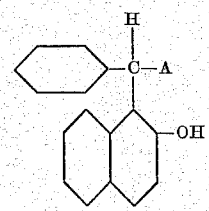

wherein A represents a nitrogen containing heterocyclic radical of the group consisting of pentamethylene and morpholyl radicals.

21. Vulcanized rubber having incorporated therein a small amount of 2-hydroxy-1-naphthyl phenyl-amino methane.

22. Vulcanized rubber having incorporated therein a small amount of phenyl-(benzylidene imino) 2-hydroxy-1-naphthyl methane.

23. Vulcanized rubber having incorporated therein a small amount of 2-hydroxy-1-naphthyl-phenyl-piperidyl-methane.

24. The method of preserving rubber which comprises incorporating in the rubber a small amount of 2-hydroxy-1-naphthyl-phenyl-amino methane.

25. The method of preserving rubber which comprises incorporating in the rubber a small amount of phenyl-(benzylidene imino) 2-hydroxy-1-naphthyl methane.

26. The method of preserving rubber which comprises incorporating in the rubber a small amount of 2-hydroxy-1-naphthyl-phenyl-piperidyl-methane.

In testimony whereof we affix our signatures.

IRA WILLIAMS.
ARTHUR MORRILL NEAL.